United States Patent
Brenes

(10) Patent No.: US 7,270,311 B1
(45) Date of Patent: Sep. 18, 2007

(54) PENDULUM GATE VALVE

(76) Inventor: Arthur J. Brenes, c/o High Vacuum Apparatus 1763 Sabre St., Hayward, CA (US) 94545

( * ) Notice: Subject to any disclaimer, the term of this patent is extended or adjusted under 35 U.S.C. 154(b) by 135 days.

(21) Appl. No.: 10/890,819

(22) Filed: Jul. 13, 2004

Related U.S. Application Data

(60) Provisional application No. 60/487,383, filed on Jul. 14, 2003.

(51) Int. Cl.
*F16K 3/04* (2006.01)

(52) U.S. Cl. .................. 251/175; 251/195; 251/302; 251/335.3

(58) Field of Classification Search ............. 251/175, 251/301, 302, 335.3, 193, 195
See application file for complete search history.

(56) References Cited

U.S. PATENT DOCUMENTS

| | | | | |
|---|---|---|---|---|
| 3,343,562 A * | 9/1967 | Combes | .................. | 251/175 |
| 3,524,467 A * | 8/1970 | Worley | .................. | 251/175 |
| 3,973,753 A * | 8/1976 | Wheeler | .................. | 251/301 |
| 4,157,169 A * | 6/1979 | Norman | .................. | 251/167 |
| 4,328,947 A * | 5/1982 | Reimpell et al. | .......... | 251/167 |
| 4,381,100 A * | 4/1983 | Schoenberg | ............. | 251/302 |
| 4,718,637 A | 1/1988 | Contin | | |
| 5,087,017 A * | 2/1992 | Sawa et al. | .............. | 251/175 |
| 5,597,184 A | 1/1997 | Brenes et al. | | |
| 5,630,444 A * | 5/1997 | Callaghan et al. | ....... | 251/335.3 |
| 5,881,998 A | 3/1999 | Brenes | | |
| 5,884,899 A | 3/1999 | Brenes | | |
| 5,924,672 A * | 7/1999 | Crochet et al. | ........... | 251/63.6 |
| 5,975,492 A | 11/1999 | Brenes | | |
| 6,089,537 A * | 7/2000 | Olmsted | ............... | 251/158 |
| 6,293,306 B1 | 9/2001 | Brenes | | |
| 6,302,372 B1 | 10/2001 | Sauer et al. | | |
| 6,409,149 B1 * | 6/2002 | Maher, Jr. | ................ | 251/301 |
| 6,443,426 B1 | 9/2002 | Brenes | | |
| 6,474,622 B2 | 11/2002 | Ito | | |
| 6,561,484 B2 * | 5/2003 | Nakagawa et al. | ........ | 251/175 |

\* cited by examiner

*Primary Examiner*—John Bastianelli
(74) *Attorney, Agent, or Firm*—Morgan, Lewis & Bockius LLP; David J. Brezner; Victor E. Johnson

(57) ABSTRACT

A pendulum gate valve includes a housing defining a valve chamber, the valve housing having a vacuum-chamber opening in a front wall and an access opening in a rear wall aligned with the vacuum-chamber opening and defining a through-hole extending from one side of the valve housing to the other side for providing access to the vacuum chamber, a carriage assembly pivotally mounted within the valve housing and moveable between a open position remote from the openings and a closed position between the openings, a valve plate reciprocally mounted on one side of the carriage assembly and movable between an unsealed position spaced from the vacuum-chamber opening and a sealed position sealing the vacuum-chamber opening, a valve-plate actuator carried on the carriage assembly for moving the valve gate between the unsealed and sealed positions, a retractable support reciprocally mounted on another side of the carriage assembly movable between a retracted position spaced from the access opening and an extended position engaging the valve housing adjacent the access opening, and a retractable-support actuator carried on the carriage assembly for moving the valve support between the retracted and support positions. Preferably, the valve-plate and retractable-support actuators are fluid actuators. A method of using the pendulum gate valve is also disclosed.

15 Claims, 14 Drawing Sheets

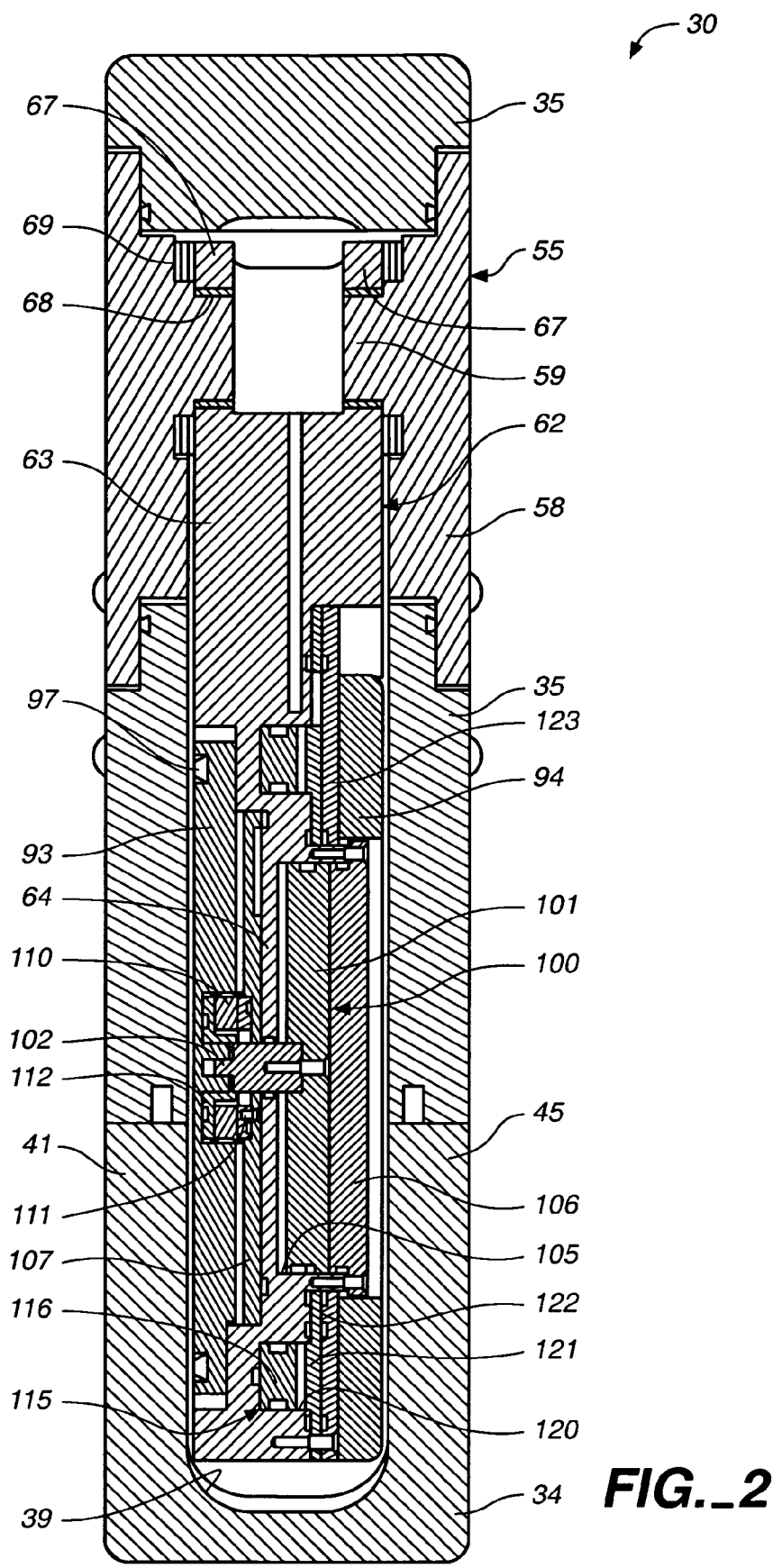
FIG._2

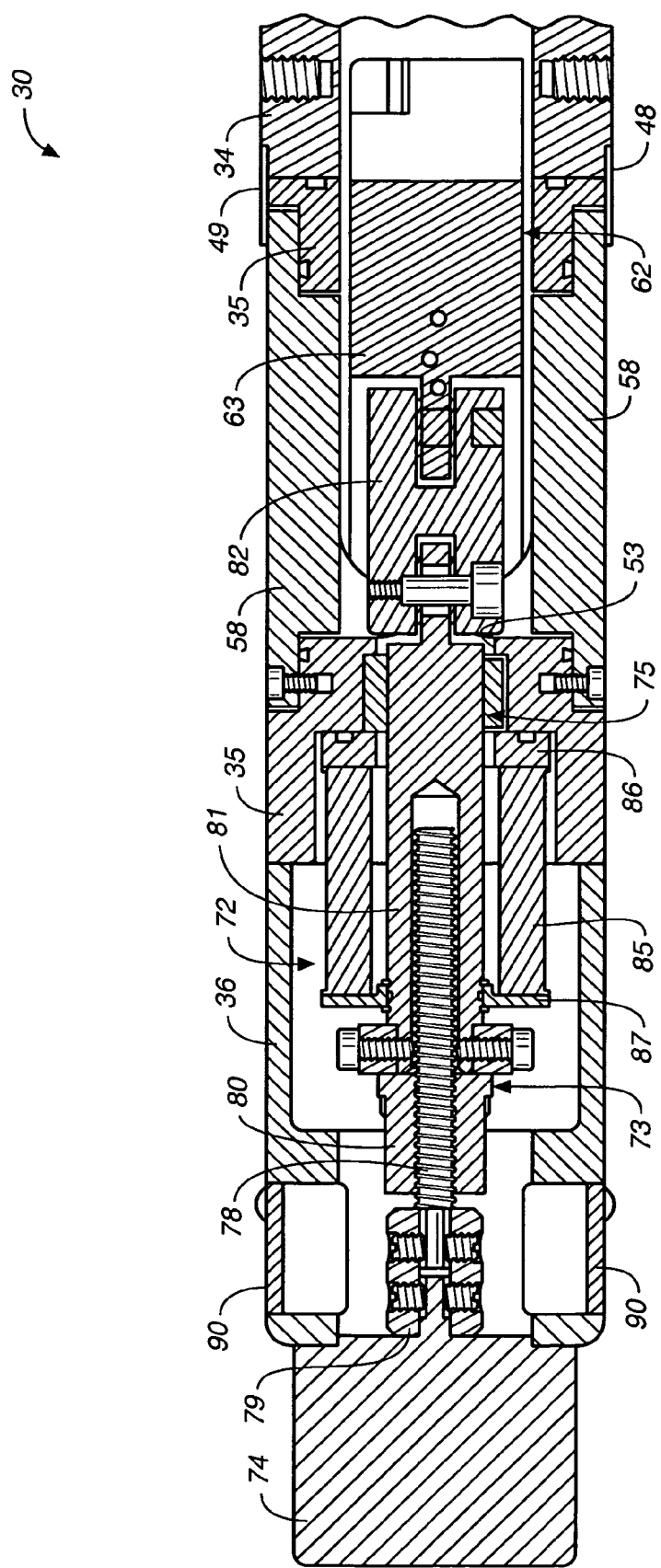
FIG._3

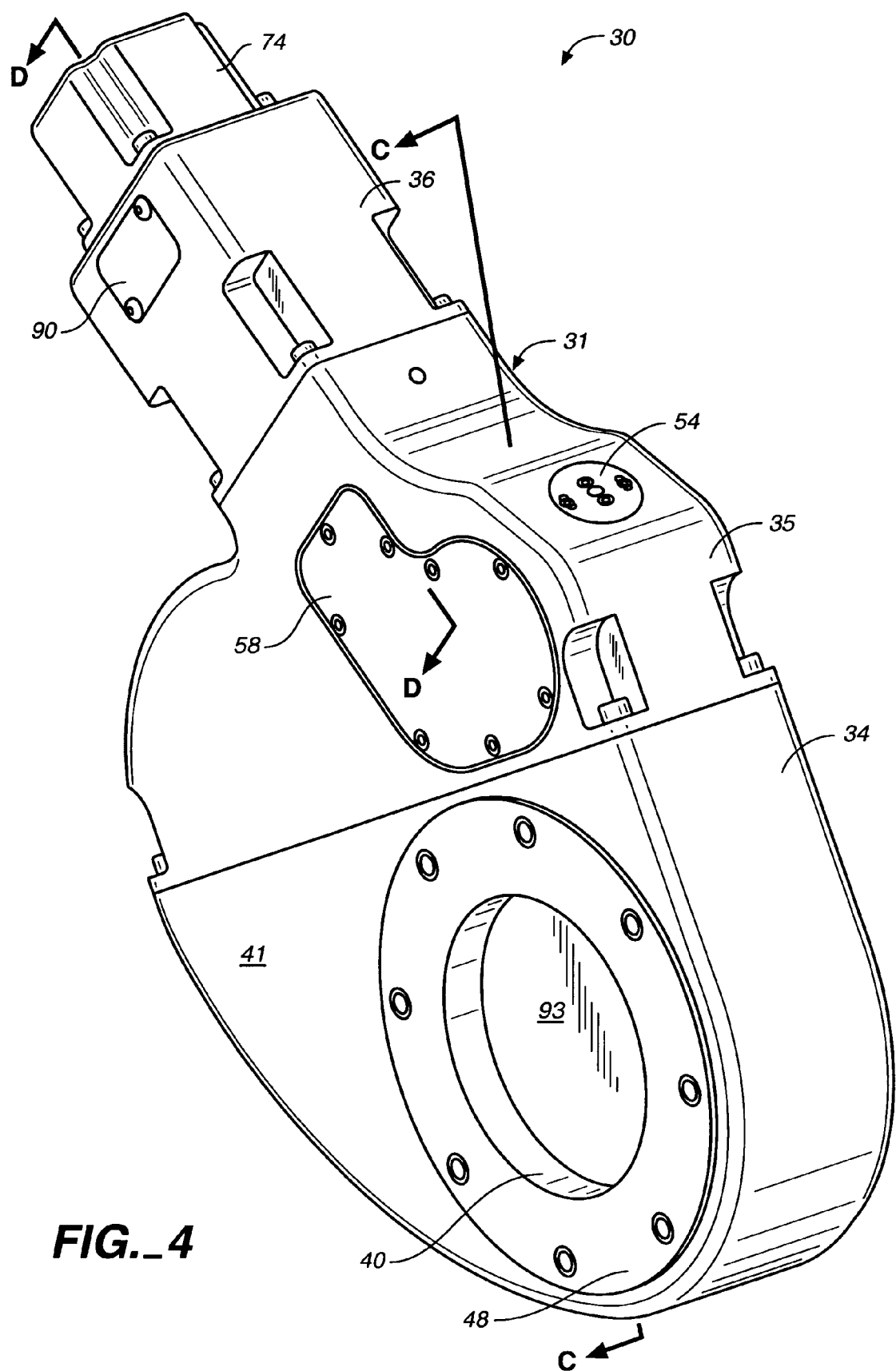
FIG._4

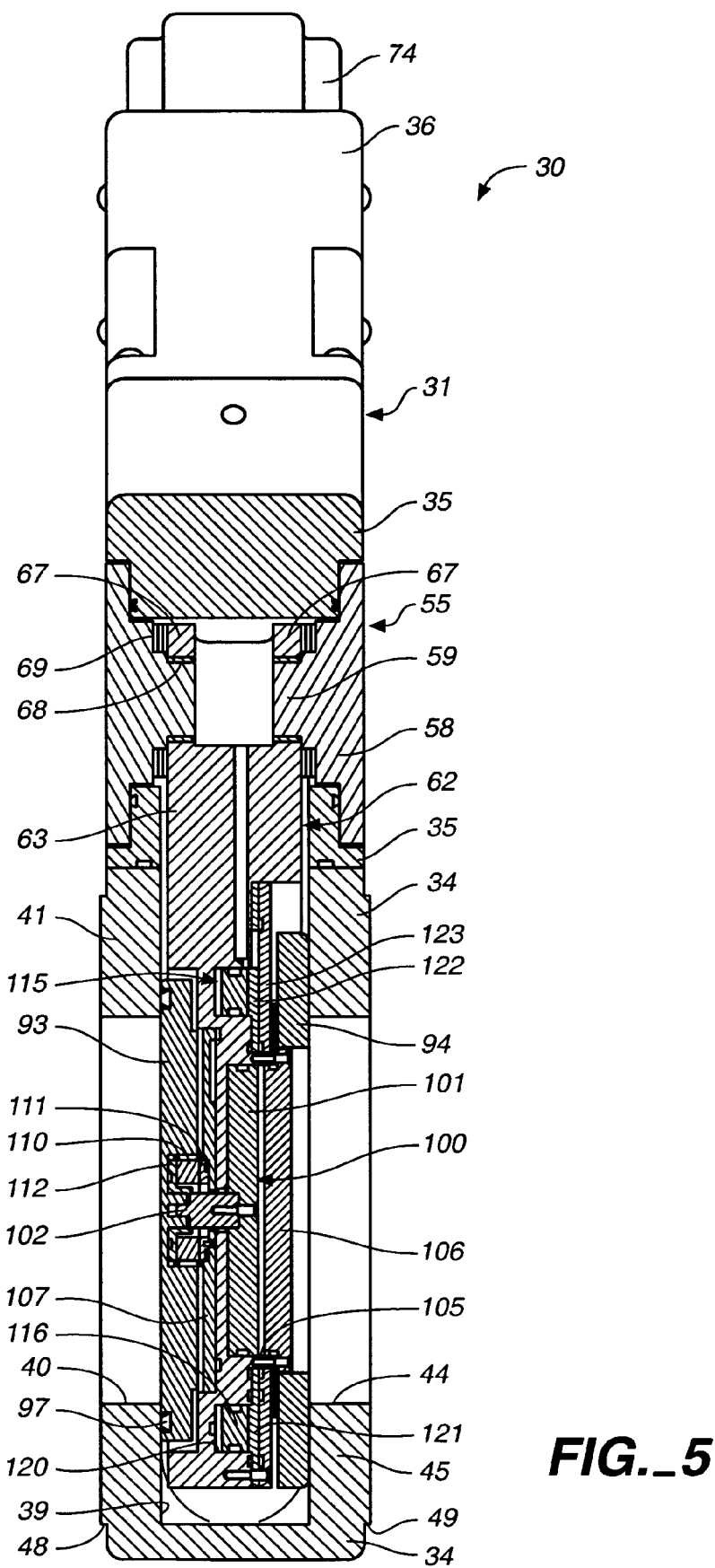
FIG._5

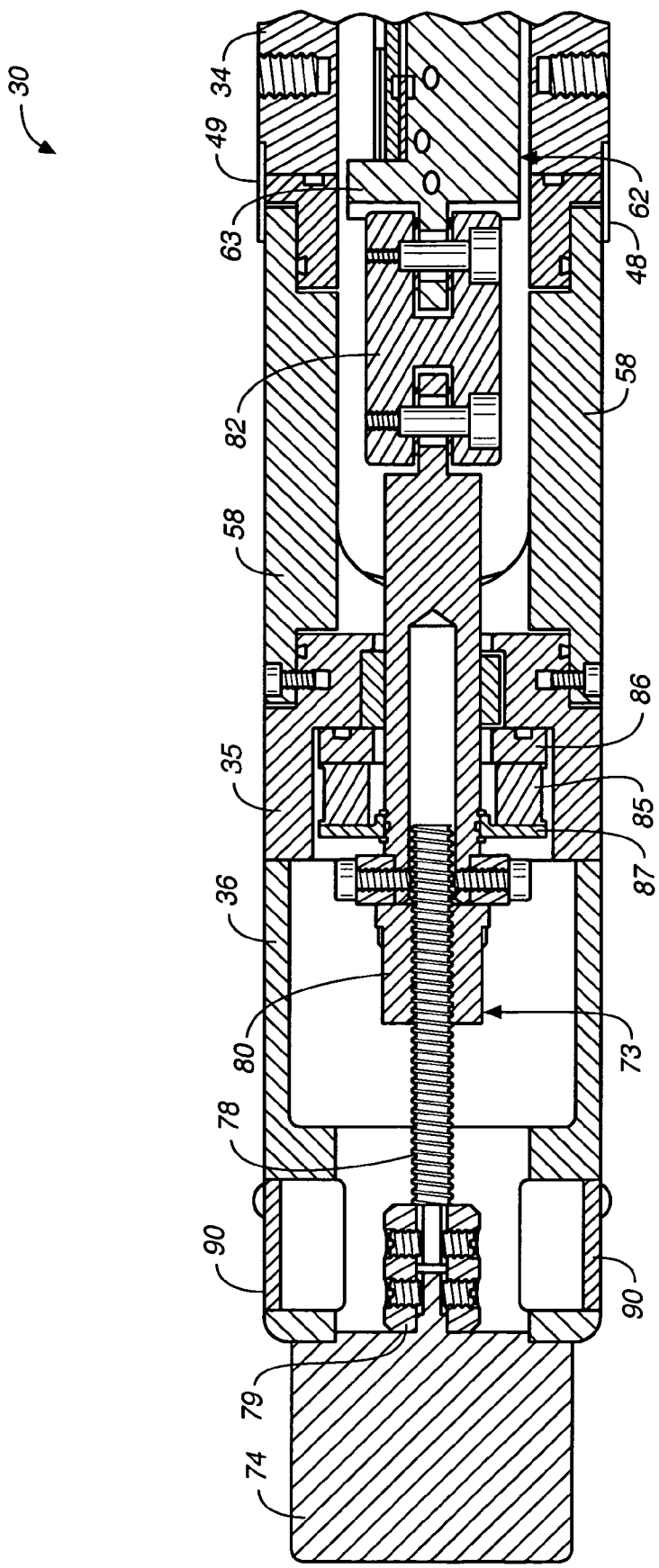
FIG._6

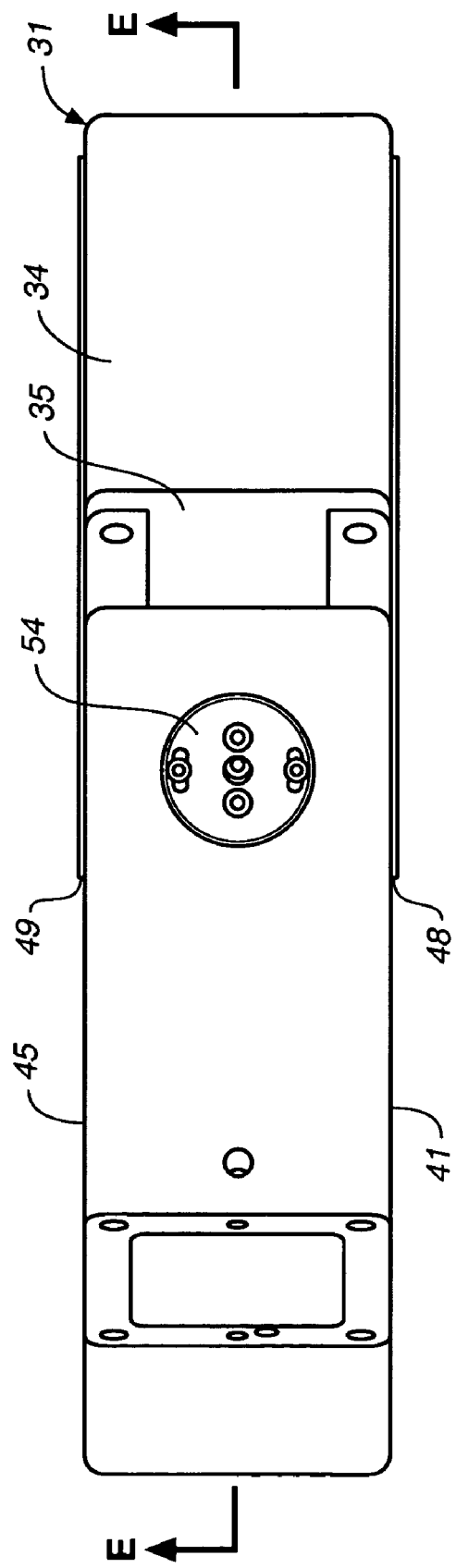
FIG._7

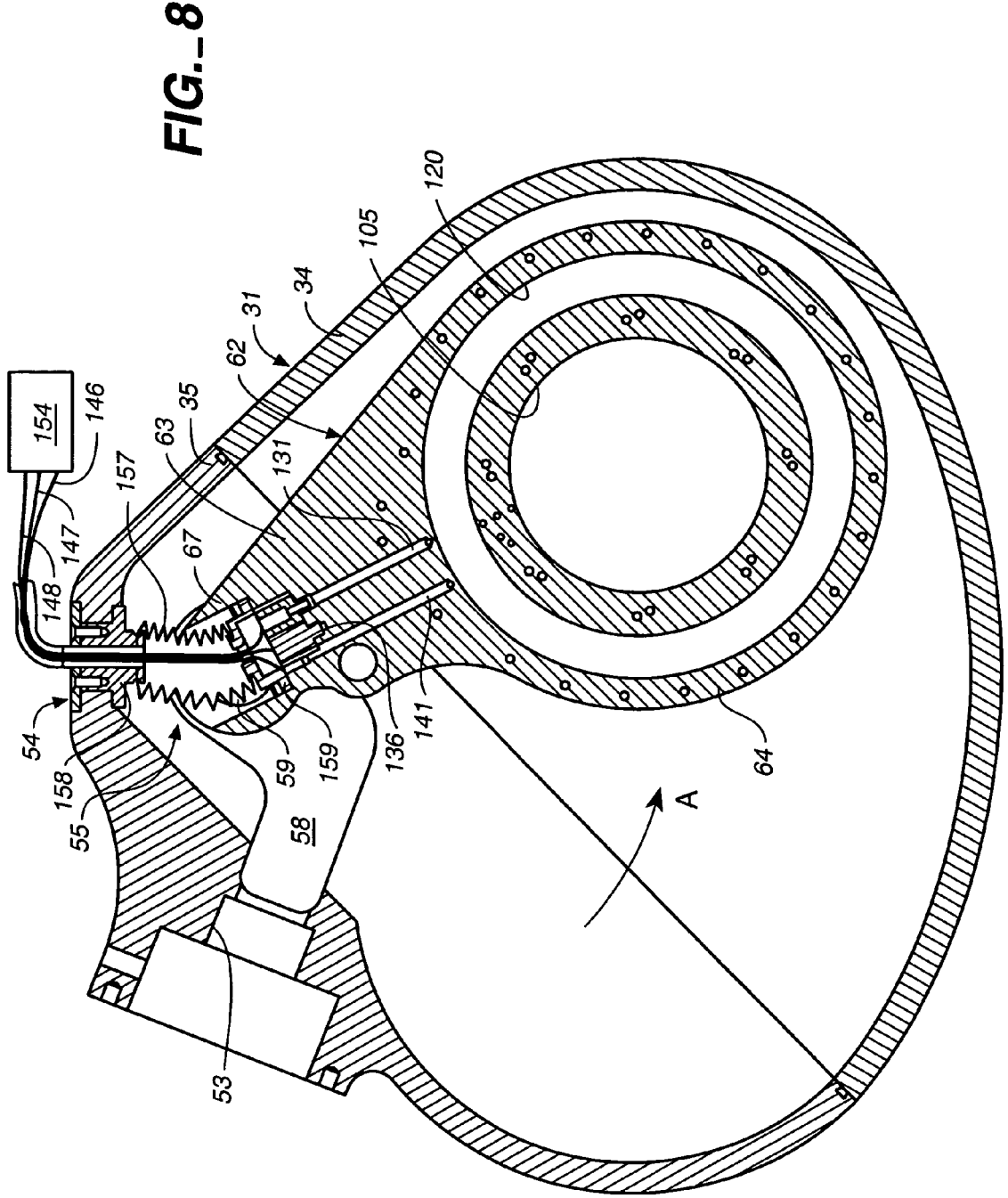
FIG._8

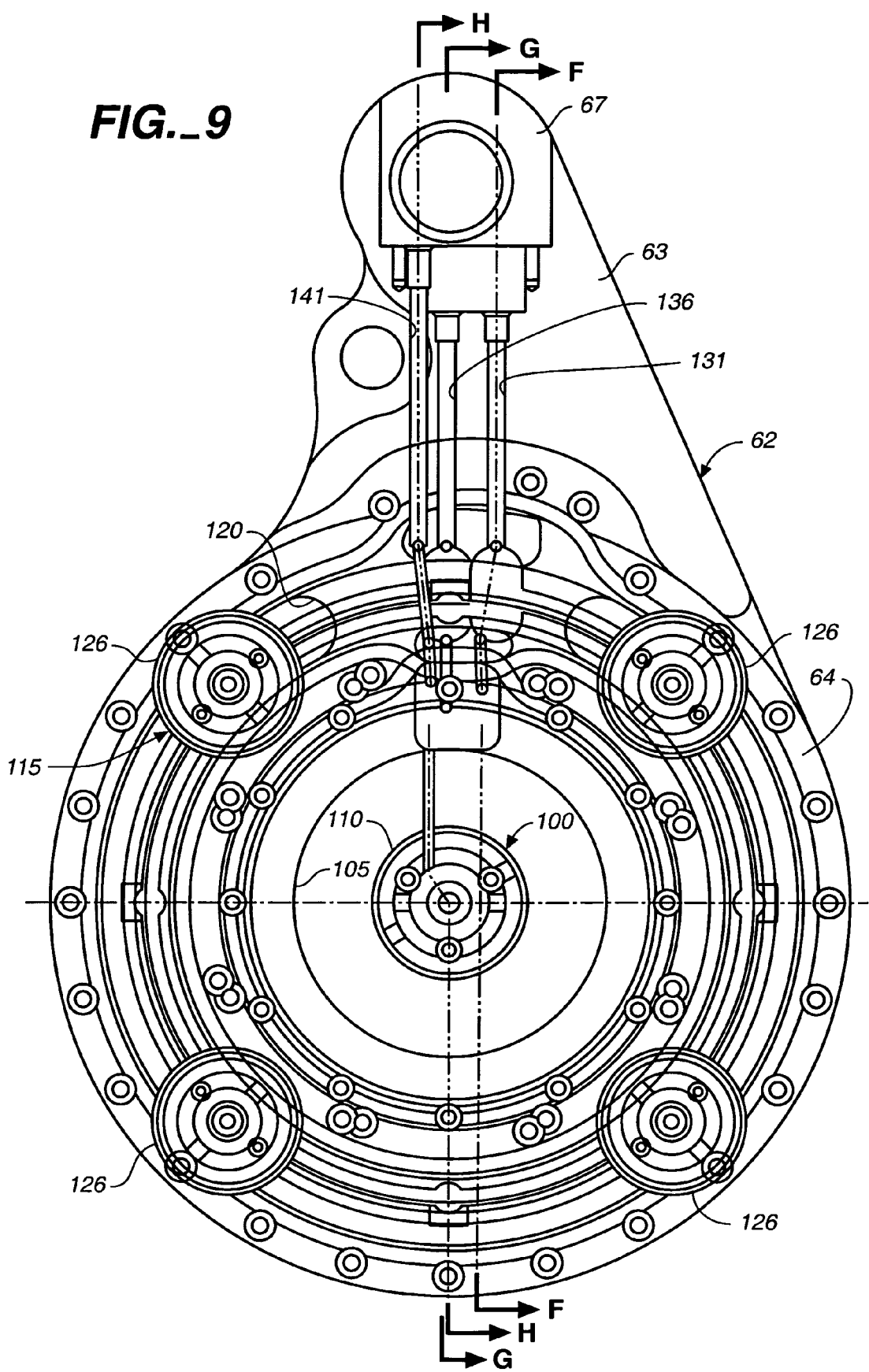
FIG._9

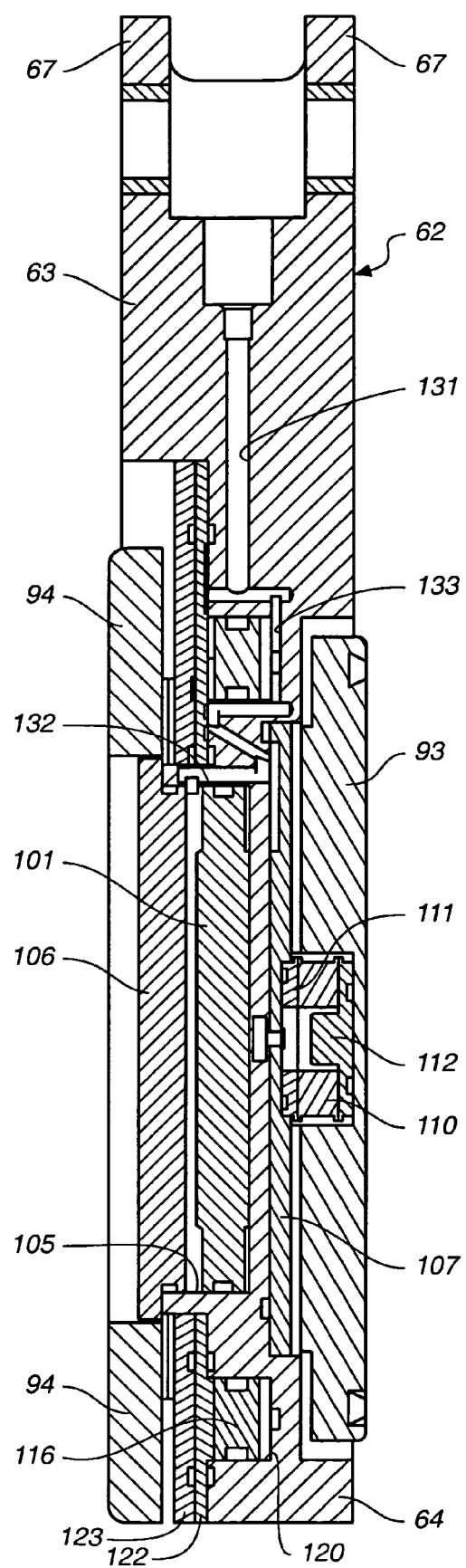
FIG._10

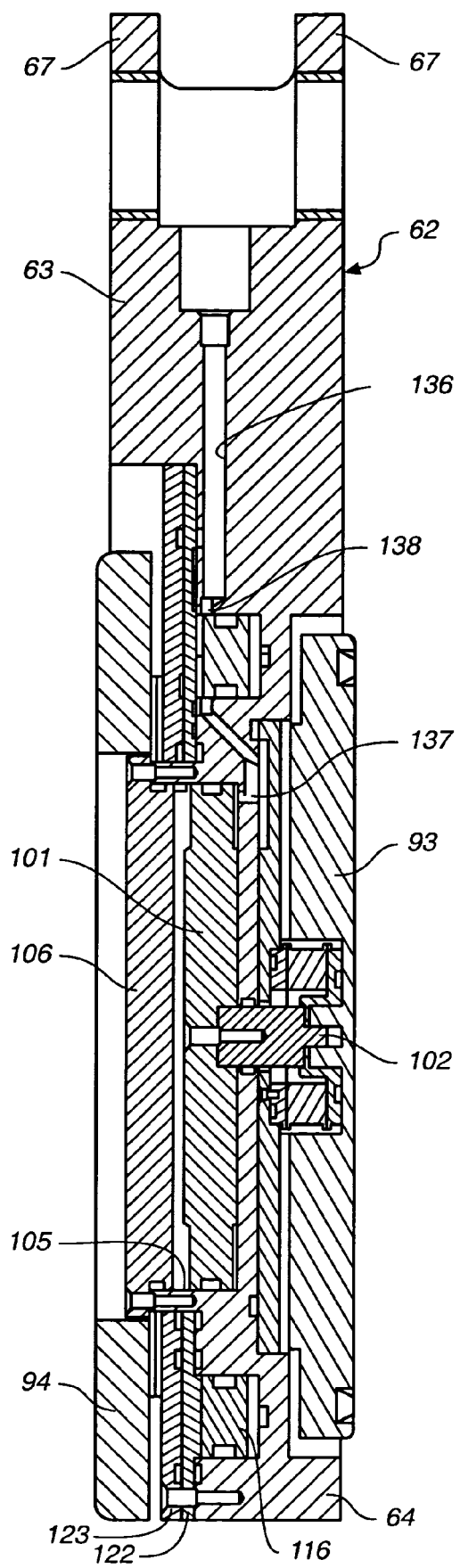
FIG._11

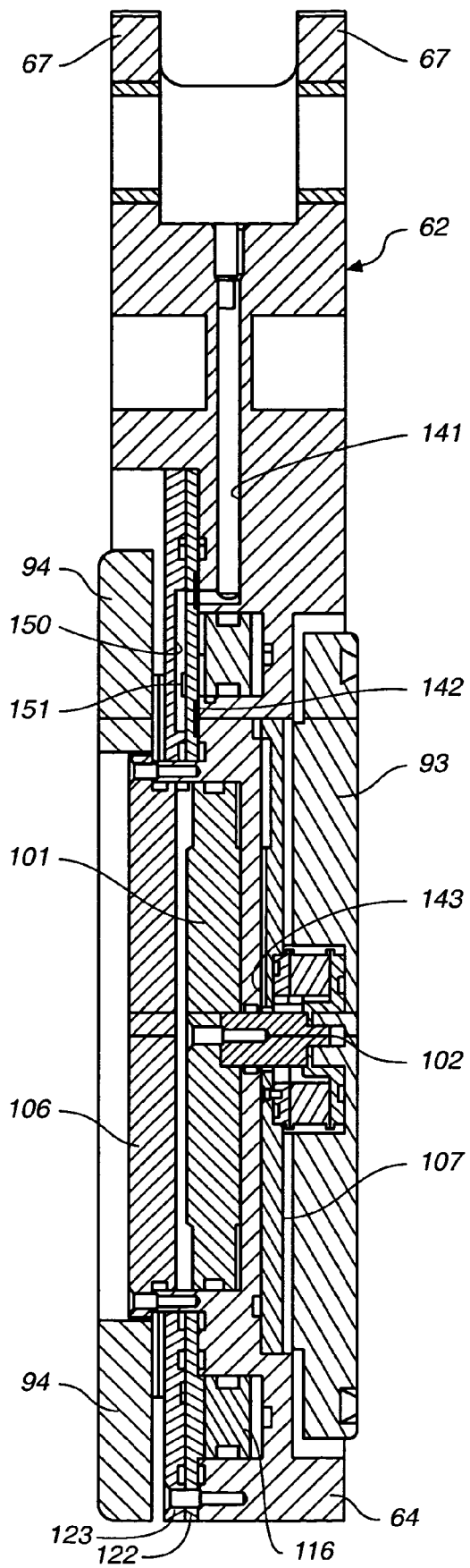
FIG._12

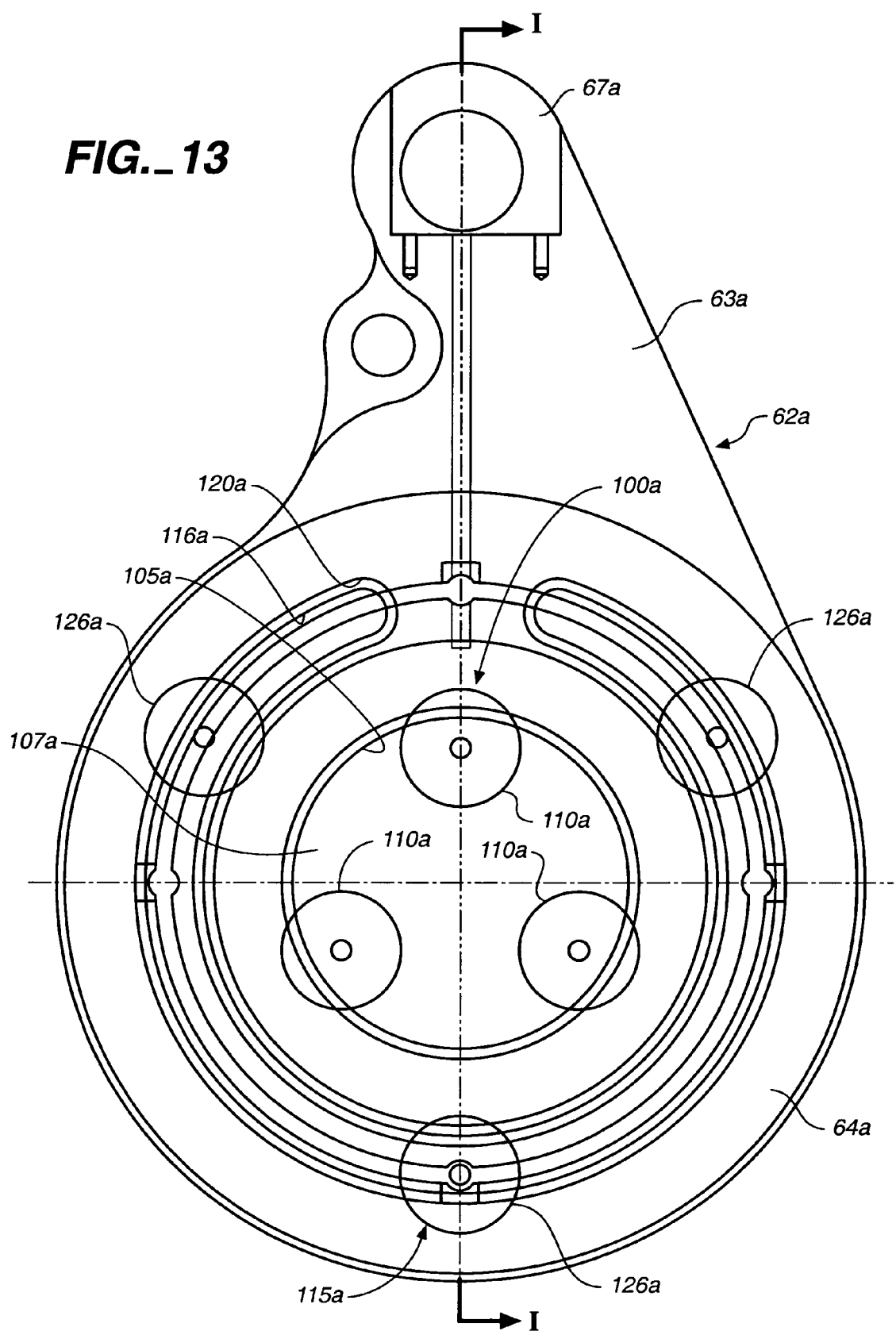
FIG._13

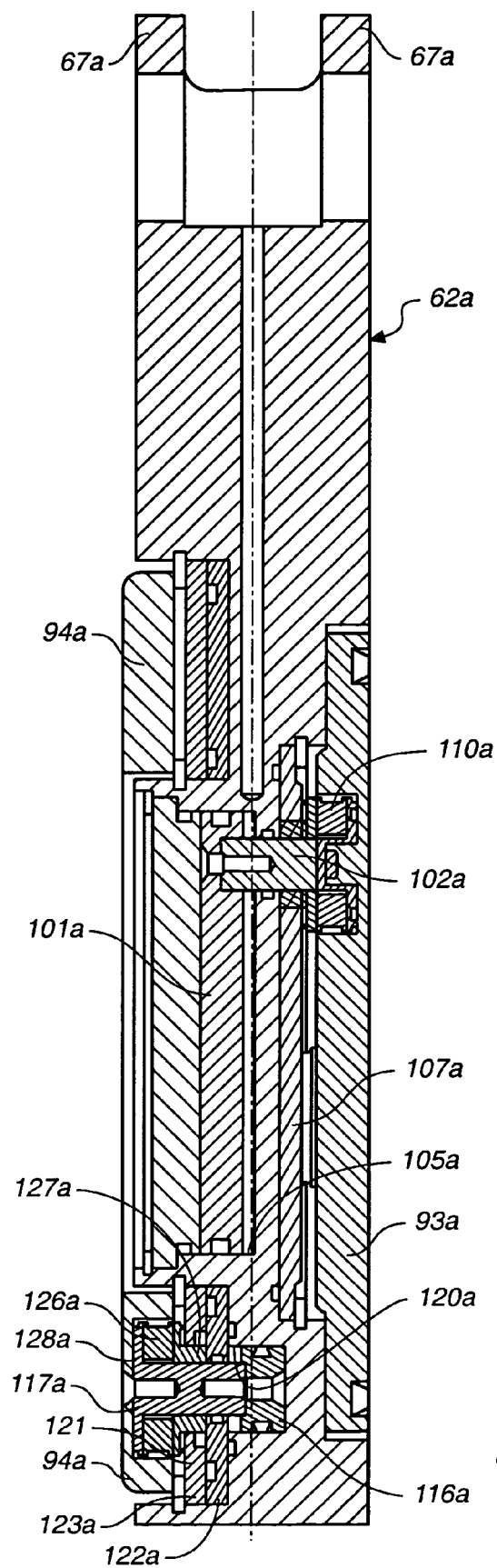
FIG._14

PENDULUM GATE VALVE

CROSS-REFERENCES TO RELATED APPLICATIONS

This application claims priority to U.S. Provisional Patent Application No. 60/487,383, filed Jul. 14, 2003 and entitled PENDULUM GATE VALVE, the entire contents of which is incorporated herein by this reference.

BACKGROUND OF THE INVENTION

1. Field of the Invention

This invention relates, in general, to a pendulum gate valve and more particularly to a pendulum gate valve for creating a vacuum tight seal to a vacuum chamber and methods for its use.

2. Description of Related Art

In the semiconductor industry, automated silicon wafer substrate handling systems are utilized to move wafers into and out of process modules that perform various operations on the wafers, such as vapor deposition, ionization, etching, etc. These handling systems are commonly referred to as cluster tools.

The processes performed on the wafers are done within vacuum chambers, and the cluster platforms and associated equipment are housed in "clean" rooms, the environments of which are strictly controlled. Vacuum chambers and clean rooms are utilized in order to prevent the smallest of particles from being introduced into the wafer matrices. In addition, the wafer processing equipment of cluster tools is designed for low particulate generation through millions of cycles of operation. To achieve ultrapure fabrication techniques, processing equipment is employed that has a minimum of moving parts, and to further prevent particle contamination, machine components are properly isolated and sealed.

With clean rooms, space utilization is of utmost importance, as the costs for operating a clean room are extremely expensive. Accordingly, there is an advantage in providing more efficient equipment in less space, in order to lower manufacturing costs.

Gate valves are commonly employed to provide vacuum seals at numerous locations between modular integrated processing equipment. For example, gate valves are positioned between wafer cassette modules and central handling modules, and between central handling modules and process modules. Gate valves open to allow transfer of wafers between modules, and close to seal off modules so that vacuum controlled processes may be performed within the modules.

Present gate valve assemblies generally include moving parts which are subject to sliding and/or reciprocal metal-to-metal contact within the valve chamber. Such contact contributes to particulate generation within the valve chamber which may contaminate the vacuum chambers of process modules to which the present gate valve assemblies are attached.

What is needed is pendulum gate valve which overcomes the above and other disadvantages of known pendulum gate valves.

BRIEF SUMMARY OF THE INVENTION

In summary, one aspect of the present invention is directed to a pendulum gate valve including, a housing defining a valve chamber, the valve housing having a vacuum-chamber opening in a front wall and an access opening in a rear wall aligned with the vacuum-chamber opening and defining a through-hole extending from one side of the valve housing to the other side for providing access to the vacuum chamber, a carriage assembly pivotally mounted within the valve housing and moveable between an open position remote from the openings and a closed position between the openings, a valve plate reciprocally mounted on one side of the carriage assembly and moveable between an unsealed position spaced from the vacuum-chamber opening and a sealed position sealing the vacuum-chamber opening, a valve-plate actuator carried on the carriage assembly for moving the valve gate between the unsealed and sealed positions, wherein the valve-plate actuator is a fluid actuator.

The valve-plate may be a pneumatic actuator fluidly connected with the fluid control system via a fluid supply line. The carriage assembly may include a carriage arm having one end pivotally supported by a pivot pin extending inwardly from at least one of the front and rear walls of the housing. The carriage arm may include a yoke having two prongs and the housing may include a pair of removable pivot plates, each having a pivot pin pivotally supporting one of the prongs of the carriage arm. The pendulum gate valve may further include a fluid-line port mounted on the housing and a carriage bellows having one end sealingly secured to the fluid-line port and another end sealingly secured to the carriage assembly between the two prongs, the fluid supply line extending through the carriage bellows and being isolated from the valve chamber.

The valve-plate actuator may include a valve-plate piston reciprocally extending form the carriage assembly. The pendulum gate valve may include a plurality of the valve-plate pistons circumferentially spaced about the carriage plate. The valve-plate piston may be enclosed by a piston bellows having one end secured to the carriage assembly and another end secured to the valve plate. The piston bellows may be stainless steel. The valve-plate actuator may be a double-acting cylinder fluidly communicated with the fluid control system.

The pendulum gate valve may further include a retractable support reciprocally mounted on another side of the carriage assembly and movable between a retracted position spaced from the access opening and an extended position engaging the valve housing adjacent the access opening, and a retractable-support actuator carried on the carriage assembly for moving the valve support between the retracted and support positions.

Another aspect of the present invention is directed to a pendulum gate valve including a housing defining a valve chamber, the valve housing having a vacuum-chamber opening in a front wall and an access opening in a rear wall aligned with the vacuum-chamber opening and defining a through-hole extending from one side of the valve housing to the other side for providing access to the vacuum chamber, a carriage assembly pivotally mounted within the valve housing and moveable between a open position remote from the openings and a closed position between the openings, a valve plate reciprocally mounted on one side of the carriage assembly and movable between an unsealed position spaced form the vacuum-chamber opening and a sealed position sealing the vacuum-chamber opening, a valve-plate actuator carried on the carriage assembly for moving the valve gate between the unsealed and sealed positions, a retractable support reciprocally mounted on another side of the carriage assembly movable between a retracted position spaced from the access opening and an extended position engaging the valve housing adjacent the access opening, and a retractable-support actuator carried on the carriage assembly for moving the valve support between the retracted and support positions. Preferably, the valve-plate and retractable-support actuators are fluid actuators.

The valve-plate and retractable-support actuators may be pneumatic actuators fluidly connected with the fluid control system via a fluid supply line. The carriage assembly may include a carriage arm having one end pivotally supported by a pivot pin extending inwardly from at least one of the front and rear walls of the housing. The carriage arm may include a yoke having two prongs and the housing may include a pair of removable pivot plates, each having a pivot pin pivotally supporting one of the prongs of the carriage arm.

The pendulum gate valve may further include a fluid-line port mounted on the housing and a carriage bellows having one end sealingly secured to the fluid-line port and another end sealingly secured to the carriage assembly between the two prongs. In this embodiment, the fluid supply line may extend through the carriage bellows and be isolated from the valve chamber.

The valve-plate actuator may include a valve-plate piston reciprocally extending from the carriage assembly in a first direction and secured to the valve plate, and the retractable-support actuator may include a retractable-support piston reciprocally extending from the carriage assembly in an opposite second direction and secured to the retractable support. The pendulum gate valve may include a plurality of the valve-plate pistons and/or a plurality of the retractable-support pistons circumferentially spaced about the carriage plate. Each of the valve-plate and retractable-support pistons may be enclosed by a piston bellows in which each piston bellows having one end secured to the carriage assembly and another end secured to a respective one of the valve plate and the retractable support. The piston bellows may be stainless steel.

Preferably, at least one of the valve-plate and retractable-support actuators is a double-acting pneumatic cylinder fluidly communicated with the fluid control system.

An object of the present invention is to provide a pendulum gate valve having a compact valve assembly which has few moving parts.

A further object of the present invention is to isolate sliding and/or reciprocal metal-to-metal contact of the above moving parts from the valve chamber of the pendulum gate valve as well as other chambers in communication with the valve chamber.

Another object of the present invention is to provide a pendulum gate valve assembly having a reciprocal valve plate and a retractable support which is configured to counteracts the force of the valve plate thereby reducing the size and strength requirements of the valve components that support the valve plate.

The pendulum gate valve of the present invention has other features and advantages which will be apparent from or are set forth in more detail in the accompanying drawings, which are incorporated in and form a part of this specification, and the following Detailed Description of the Invention, which together serve to explain the principles of the present invention.

BRIEF DESCRIPTION OF THE DRAWINGS

FIG. 2 is a cross-sectional view of the pendulum gate valve of FIG. 1 taken along line A-A of FIG. 1.

FIG. 3 is a cross-sectional view of the pendulum gate valve of FIG. 1 taken along line B-B of FIG. 1.

FIG. 4 is a perspective view of a pendulum gate valve of FIG. 1, the valve plate assembly being positioned in a closed position.

FIG. 5 is a cross-sectional view of the pendulum gate valve of FIG. 1 taken along line C-C of FIG. 4.

FIG. 6 is a cross-sectional view of the pendulum gate valve of FIG. 1 taken along line D-D of FIG. 4.

FIG. 7 is a top plan view of the pendulum gate valve of FIG. 1 shown with a linear actuator thereof removed.

FIG. 8 is a cross-sectional side view of a carriage assembly pivotally mounted within a housing of the pendulum gate valve of FIG. 1 taken along line E-E of FIG. 7, the carriage assembly schematically shown to be interconnected with a fluid control system by fluid lines.

FIG. 9 is a schematic side view of the carriage assembly of the pendulum gate valve of FIG. 1.

FIG. 10 is a cross-sectional view of the carriage assembly taken along line F-F of FIG. 9 illustrating a first fluid supply passageway for sealing the pendulum gate valve.

FIG. 11 is a cross-sectional view of the carriage assembly taken along line G-G of FIG. 9 illustrating a second fluid supply passageway for unsealing the pendulum gate valve.

FIG. 12 is a cross-sectional view of the carriage assembly taken along line H-H of FIG. 9 illustrating a fluid vent line.

FIG. 13 is a schematic side view of a modified carriage assembly similar to that shown in FIG. 9.

FIG. 14 is a cross-sectional view of the carriage assembly of FIG. 13 taken along line I-I of FIG. 13.

DETAILED DESCRIPTION OF THE INVENTION

Figure 1:
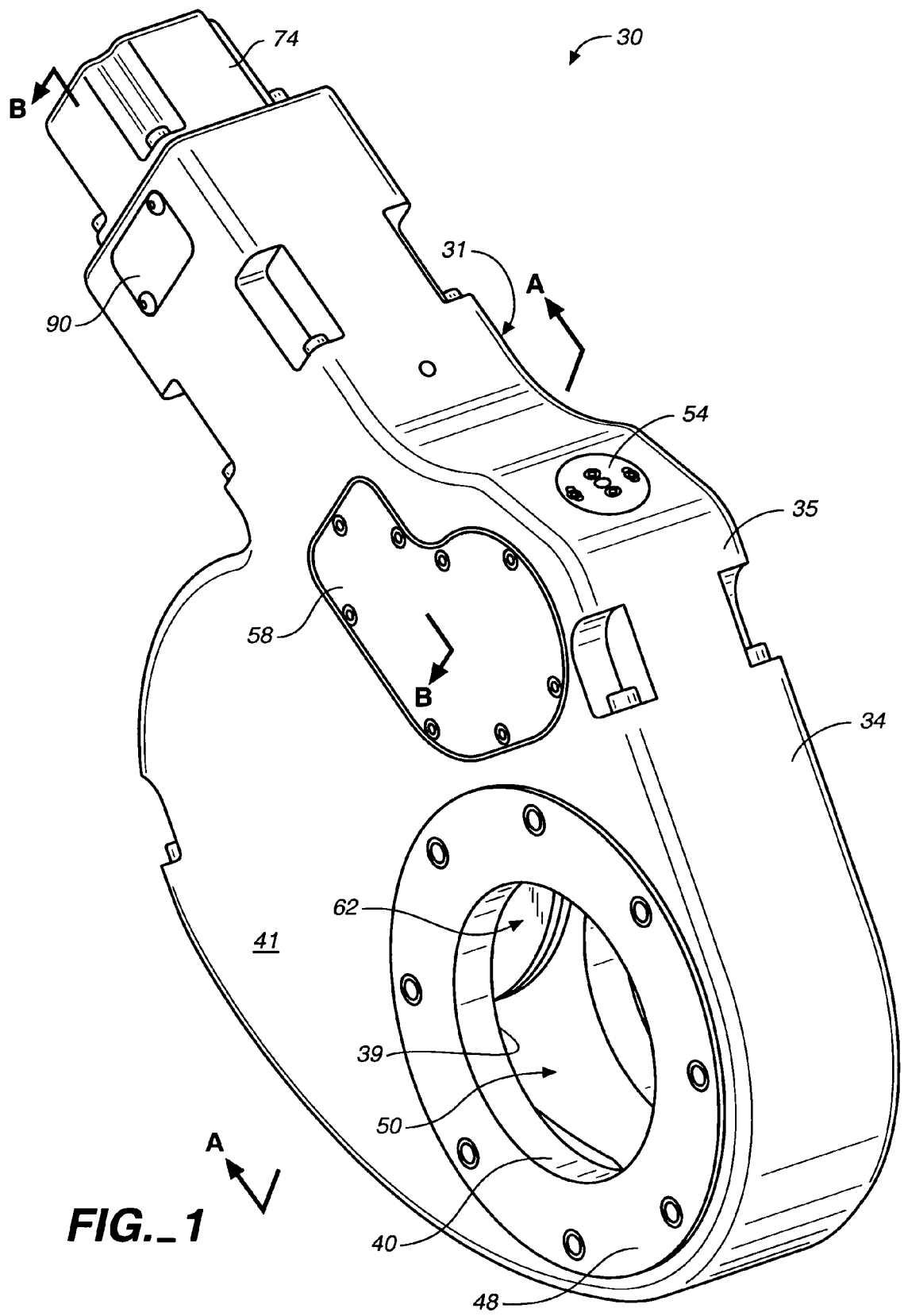
FIG. 1 is a perspective view of a pendulum gate valve in accordance with the present invention, a valve plate assembly thereof being positioned in an open position.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Turning now to the drawings, wherein like components are designated by like reference numerals throughout the various figures, attention is directed to FIG. 1 which illustrates a pendulum gate valve, generally designated 30, for creating a vacuum tight seal to a vacuum chamber in accordance with the present invention. For example, the pendulum gate valve of the present invention may be utilized with various systems including a vacuum chamber unit or module including, but not limited to, automated substrate handling systems and other devices employed in modular robotic wafer fabricating systems and/or flat panel handling equipment configured to transfer items including, but not limited to, substrates such as wafers, flat panels, or the like, to or from a transfer module and/or various process modules. In some aspects, various components and uses of the pendulum gate valve of the present invention are similar to those of the valves disclosed by my prior U.S. Pat. Nos. 6,293,306, 5,975,492, 5,884,899 and 5,881,998, the entire content of which patents is incorporated herein by this reference.

Referring to FIG. 1, a pendulum gate valve 30 is shown constructed in accordance with a preferred embodiment of the present invention. The pendulum gate valve includes a generally asymmetrical housing 31 that is relatively long and has a narrow profile. The narrow profile of housing 31 allows the placement of adjacent modules including, but not limited to, process and transfer modules, in close proximity with each other. The pendulum gate valve may be positioned between the adjacent modules to provide access therebetween and a selectively engagable vacuum-tight seal therebetween. Housing 31 is formed by three-pieces including an gate casing 34, a pivot casing 35, and an actuator casing 36. Suitable fasteners and seals secure gate casing 34, pivot casing 35, and actuator casing 36 together and seal their joints to form a vacuum-tight, sealed interior valve chamber 39.

Gate casing 34 includes a generally circular opening 40 in a front wall 41 which is adapted to provide a gate for and into a vacuum chamber of the module to which pendulum gate valve 30 is attached. The front opening is aligned with a similar, generally circular opening in a rear wall 45 of the opening casing (not shown in FIG. 1) which is adapted to provide access into and through valve chamber 39 as well as access into the vacuum chamber. The gate casing also includes a front-opening mounting flange 48 and/or other suitable structure adapted for securing the pendulum gate valve to the vacuum-chamber module in a well-known manner. Alternatively, the housing may be provided with recesses, such as the recesses described in the '492 patent, that include inwardly directed flanged rims that cooperate with various types of clamp mechanisms to secure the pendulum gate valve in position between system modules.

The aligned circular openings in the front and rear housing walls form a through-hole 50 that extends through housing 31 for providing substantially unobstructed access to the vacuum chamber. The through-hole can be said to define a flow path through which gases are moved (either evacuated or introduced and along which handling equipment moves to transfer wafers or other types of substrates between modules. For example, through-hole 50 may be dimensioned and configured to allow robotic wafer or flat panel handling equipment to transfer substrates or the like between a transfer module and various process modules. The aligned openings forming through-hole 50 may also define an unobstructed flow-path extending across the valve chamber through housing 31 through which gases move as adjacent module chambers are evacuated.

Pivot casing 35 includes a carriage-actuator port 53, a fluid port 54 and a pivot assembly 55, as shown in FIG. 8. Pivot assembly 55 includes front and rear pivot plates 58 which are removably secured to respective front and rear walls of pivot casing 35 by suitable fasteners including, but not limited to, screws, nuts, bolts, and the like. Each pivot plate also includes an inwardly extending pivot pin 59 that provides a pivot axis for a carriage assembly 62 pivotally mounted within housing 31, an also shown in FIG. 2 and FIG. 5.

Returning to FIG. 8, carriage assembly 62 has a pendulum-like shape and includes an elongated carriage arm 63 and a generally circular carriage plate 64 which are configured to support the valve plate, one or more actuators, and other valve structure such as a retractable support, as discussed in greater detail below. One will appreciate, however, that the the carriage assembly, as well as that of the housing and the pendulum gate valve of the present invention, may utilize various shapes, geometries and dimensions in accordance with the present invention. For example, the carriage assembly may have a polygonal shape in which the carriage plate has a generally rectangular shape and the carriage arm has a generally triangular shape in order to support a rectangular shaped valve plate for pivotal motion about the apex of the triangular carriage arm.

Carriage assembly 62 is pivotally mounted within the valve chamber such that the carriage assembly pivots between an open position in which the carriage plate is located away from the openings, shown in FIG. 1, and a closed position in which the carriage plate is substantially aligned with and positioned between the openings, as shown in FIG. 4. One will appreciate that when the carriage assembly is in the open position, the carriage plate, as well as the valve plates, actuators and other structure supported thereon, is positioned out of the flow-path thus providing substantially unobstructed assess to the vacuum chamber upon which the pendulum gate valve is mounted. Similarly, when the carriage assembly is in the closed position, the carriage plate and valve plate are positioned in the flow-path such that the actuator(s) may extend the valve plate in order to fluidly seal the valve plate against the vacuum-chamber opening.

Referring back to FIG. 2 and FIG. 4, it can be seen that an upper end of the carriage arm 63 includes a two pronged yoke 67 pivotally mounted on a pair of pivot bearings 68 and spaced from the interior surfaces of the pivot casing by a pair of pivot thrust bearings 69. As the carriage actuator, in particular, a drive shaft of the carriage actuator is extended and retracted, carriage assembly 62 pivots between open and closed positions but does not contact the inner walls of either the gate casing or the pivot casing, thereby ensures that no loose particles are generated by metal-to-metal contact.

With reference to FIG. 3 and FIG. 6, a carriage actuator 72 is operably coupled to carriage assembly 62 for selectively driving the carriage assembly between its open and closed positions. Preferably, the carriage actuator is a linear actuator. In one embodiment, the carriage actuator includes a ball assembly 73 for mechanically converting rotary motion of a stepper motor 74 to linear motion of a drive shaft assembly 75 that is pivotally linked with carriage assembly 62. One will appreciate that the carriage actuator may include other suitable actuator means including, but not limited to, pneumatic and/or hydraulic cylinders and or other suitable motors.

As shown in FIG. 3, stepper motor 74 is supported by the actuator casing 36 and is rotationally secured to a ball screw 78 by a motor coupling 79 and/or other suitable means such that the ball screw rotates with and is driving by a motor shaft of the stepper motor in a well-known manner. The ball screw, in turn, is operatively coupled to a ball nut 80 that secured on one end of a linear drive shaft 81. The linear drive shaft extends through carriage-actuator port 53 of pivot casing 35 into the vacuum chamber 39, as shown in FIG. 3 and FIG. 6. An opposite end of the drive shaft is operably coupled to the carriage assembly by a coupling link 82 such that the drive shaft is restrained from rotation about its longitudinal axis but is allowed to reciprocate back and forth along its longitudinal axis through the carriage actuator port.

As shown in FIG. 3 and FIG. 6, a drive bellows 85 is provided to vacuum seal the vacuum chamber 39 and to isolate the vacuum chamber from the rotating components of the stepper motor, ball assembly and other components rotating components. A bellows-base flange 86 secures one end of the drive bellows to the pivot casing while a bellows-shaft flange 87 secures the opposite end of the drive bellows to the drive shaft. The drive bellows configuration of the carriage actuator allows removal of the stepper motor as well as the actuator casing from the pivot casing and the remainder of the housing while preserving the seal integrity of the vacuum chamber. In this regard, the actuator casing includes a removable motor-coupling cover 90 that facilitates access to the motor coupling for disengaging and reengaging the stepper motor and the ball screw. One will also appreciate that a plurality of actuator-casing fasteners are readily accessible thereby facilitating assembly and disassembly of the actuator casing to and/or from the pivot casing.

As the drive shaft is coupled to the carriage assembly adjacent the pivot axis of the pivot pins, the carriage actuator is aligned above and substantially parallel to the motion of the carriage plate and valve plate assembly and thus significantly reduces the size of the pendulum gate valve assembly while providing for a full range of travel of the carriage plate and valve plate assembly. The configuration of the carriage actuator also minimizes the amount of "throw" or linear travel necessary to effectuate the full range of travel thus reducing the size and strength requirements of the carriage actuator.

Carriage assembly 62 carries or supports a valve gate assembly between the open and closed positions. In the illustrated embodiment, carriage assembly 62 carries a valve gate in the form of a circular valve plate 93 and retractable support in the form of an annular support ring 94. Both of the circular valve plate and the annular support ring are reciprocally movable between respective retracted unsealed positions, shown in FIG. 2, and respective extended sealed positions, shown in FIG. 5. The valve plate and the support ring are selectively moved by one or more fluid actuators. When carriage assembly 62 is in the position shown in FIG. 1 and FIG. 2, valve plate 93 and support ring 94 are in their retracted positions and there is sufficient clearance between the interior surface of the housing and both the valve plate and the support ring thereby allowing the carriage assembly to pivot between its open and closed position. Once the carriage assembly is located in the closed position shown in FIG. 4 and FIG. 5, valve plate 93 and support ring 94 can be moved transversely away from one another, and thus outward and away from carriage plate 64, toward and against the internal wall surfaces of the housing for sealing engagement of valve plate 93 about front opening 40 while support ring 94 engages the rear wall of the housing about rear opening 44 in order to counteract the force of the valve plate against the housing thus providing support for the carriage plate and the valve plate.

Preferably, the valve plate is provided with a seal, for example, an elastomeric seal and/or other suitable means, to create a seal interface between the valve plate and the respective interior wall surfaces about the front opening. In the illustrated embodiment valve plate 93 is provided with an annular sealing groove which receives a valve o-ring 97. One will appreciate that the support ring may also be provided with such an elastomeric member to further minimize metal-to-metal contact.

As shown in FIG. 5, the valve plate and the support ring are slightly larger than the openings. In particular, the valve plate and the support ring have a larger outer diameter than the inner diameter of the openings. Such configuration allows the o-ring of the valve plate to engage the front interior wall surface adjacent and around the front opening when the carriage assembly is in the closed position and the valve plate is in the sealed position. Thus, in the sealed position, the valve plate functions to seal off the pendulum gate valve and the process module to which it is attached. Such configuration also allows the annular support ring to engage the rear interior wall surface of the gate casing adjacent and around the rear opening when to lend support to the carriage plate and the valve plate.

Referring to FIG. 2 and FIG. 5, a valve-plate actuator 100 is provided to move the valve plate between its unsealed and sealed positions. In the illustrated embodiment, valve-plate actuator 100 includes a first double-acting fluid cylinder assembly having a valve-plate piston 101 and a valve-plate piston rod 102 secured to a central portion of the valve plate. The valve-plate piston is disposed in a circular working chamber 105 disposed in a central portion of the carriage plate. The circular working chamber is accessible through a removable circular piston cover 106 that is secured to the carriage plate by suitable means including, but not limited to, machine screws, ring-clips and/or other well-known fasteners.

Valve-plate piston rod 102 is secured on one end to the valve-plate piston and extends through central apertures of both carriage plate 62 and a circular fluid panel 107 that is removably secured to the carriage plate. The valve-plate piston rod is secured on the opposite end to the valve plate thus allowing the valve plate to reciprocate with the valve plate piston. A valve-plate bellows 110 is provided to isolate the moving components of the valve-plate actuator (for example, the sliding metal-to-metal contact of the piston within circular working chamber 105) from the valve chamber and thus from the vacuum chamber. A fixed end 111 of the valve-plate bellows is secured to the circular fluid panel while a reciprocal end 112 is secured to the valve plate.

Referring to FIG. 2 and FIG. 5, a support-ring actuator 115 is provided to move the support ring between its retracted and extended positions. In the illustrated embodiment, the support-ring actuator includes a second double-acting fluid cylinder assembly having an annular support-ring piston 116 and a plurality of circumferentially spaced support-ring piston rods 117. In the illustrated embodiment, the support-ring piston does not form a complete circle as does the annular working chamber. One will appreciate, however, that the support-ring piston and corresponding working chamber may be configured to form a complete annulus and may instead of only a partial circle. Alternatively, one or more support-ring pistons and corresponding working chamber may be provided.

Each support-ring piston rod is secured to a respective portion of the support ring in order to distribute the force of motion of the support-ring piston to the support ring. In the illustrated embodiment shown in FIG. 9, four circumferentially spaced support-ring piston rods 117 are provided, however, one will appreciate that two, three, four or more support-ring piston rods may be provided. Preferably, the support-ring piston rods are equilaterally spaced about the support ring in order to distribute forces substantially equally to the support ring. Alternatively, a single support-ring piston rod configuration may be utilized in a similar fashion valve-plate actuator 100 discussed above.

The support-ring piston is disposed in an annular working chamber 120 which is disposed in an annular portion of the carriage plate substantially concentric with and radially outward of circular working chamber 105. The annular working chamber is accessible through a removable annular piston cover 121 that is removable secured to the carriage plate by suitable means including, but not limited to, machine screws, ring-clips and/or other well-known fasteners.

Each support-ring piston rod 117 is secured at one end to the support-ring piston 116 and extends through respective, radially spaced apertures of the carriage plate. Each support-ring piston rod also extends through a first inner annular fluid panel 122 and an outer annular fluid panel 123, both of which are removably secured to the carriage plate. Each support-ring piston rod is secured on its opposite end to the support ring thus allowing support ring 94 to reciprocate with the support-ring piston. A support-ring bellows 126 is provided encircling each support-ring piston rod in order to isolate the moving components of the support-ring actuator (for example, the sliding metal-to-metal contact of the piston within annular working chamber 120) from valve chamber 39 as well as the from the vacuum chamber. A fixed end 127 of each support-ring bellows is secured to a respective portion of the outer annular fluid panel while a reciprocal end 128 is secured to the valve plate.

Turning now to FIG. 9 through FIG. 12, a first fluid supply passageway 131 extends through carriage arm 63 and is configured to provide fluid to valve-plate and support-ring actuators 100 and 115 for selectively sealing the pendulum gate valve. As shown in FIG. 10, the first fluid supply passageway is fluidly connected, via a first valve-plate branch 132 to circular working chamber 105 on the right side of valve-plate piston 101 such that fluid supplied to the chamber will move the valve-plate piston to the right, as viewed in FIG. 10, thus moving to the valve plate to the sealed position.

The first fluid supply passageway is also fluidly connected, via a first support-ring branch 133 to the annular working chamber 120 on the left side of support-ring piston 116 such that fluid supplied to the chamber will move the support-ring piston to the left, as viewed in FIG. 10, thus moving the support-ring to the extended position. As the first fluid supply passageway simultaneously provides fluid to both the valve-plate and support-ring cylinder assemblies, both the valve plate and the support ring will move simultaneously outward and away from each other.

Turning now to FIG. 11, a second fluid supply passageway 136 extends through carriage arm 63 and is configured to provide fluid to valve-plate and support ring cylinder assemblies 100 and 115 for unsealing the pendulum gate vale. The second fluid supply passageway is fluidly connected, via a second valve-plate branch 137 to circular working chamber 105 on the right side of valve-plate piston 101 such that fluid supplied to the chamber will move the valve-plate piston to the left, as viewed in FIG. 11, thus moving to the valve plate to the retracted, unsealed position.

Second fluid supply passageway 136 is also fluidly connected, via a second support-ring branch 138 to the annular working chamber 120 on the left side of support-ring piston 116 such that fluid supplied to the chamber will move the support-ring piston to the right, as viewed in FIG. 11, thus moving the support-ring to the retracted position. As is the case with the first fluid supply passageway above, the second fluid supply passageway simultaneously provides fluid to both the valve-plate and support-ring cylinder assemblies. Accordingly, both the valve plate and the support ring will move simultaneously inward and toward one other.

Preferably, a fluid vent passageway 141 extends through carriage arm 63, as shown in FIG. 12. The vent passageway is configured to allow the exhaust of fluid from the circular and annular working chambers. In particular, vent passageway allows the working chambers to breathe as the piston rods are extended and retracted. In this regard, a valve-plate vent branch 142 fluidly connects the circular working chamber to the vent passageway, and a support-ring vent branch 143 fluidly connects the annular working chamber to the vent passageway.

The provision of circular fluid panel 107, inner annular fluid panel 122 and outer annular fluid panel 123 facilitate fabrication of the fluid supply and vent passageways and branches through carriage assembly 62. As shown in FIG. 9 through FIG. 12, portions of the fluid passageways and branches may be milled into the panels. The panels also serve as caps which enclose portions of the passageways and branches that are milled into the surface of the carriage assembly and/or milled into the surface of an adjacent panel. For example, outer annular fluid panel 123 includes a milled recess 150 and a milled groove 151 which fluidly connect fluid vent passageway 141 with circular and annular working chambers 105 and 120. Preferably, the panels are secured to the carriage plate by suitable means including, but not limited to, machine screws, ring clips and/or other well-known fasteners.

Preferably, the valve-plate and support-ring actuators are pneumatic actuators. One will appreciate, however, that other suitable means may be utilized instead of, or in addition to, the pneumatic actuators including, but not limited to, hydraulic actuators. One will also appreciate that single-acting cylinders may be utilized instead of or in addition to the double-acting cylinders described above. Furthermore, one will also appreciate that the pendulum gate valve may be configured such that the valve-plate actuator and the support-ring actuators are separately controlled.

As shown schematically in FIG. 8, first and second fluid control lines 146 and 147 extend through fluid port 54 and respectively interconnect first and second fluid supply passageways 131 and 136 to a fluid control system 154 in order to control the action of the valve plate and the support ring. A fluid vent line 148 also extends through the fluid port and interconnects the vent passageway with the fluid control system, which system may be provided with a fluid reservoir, an accumulator and/or an exhaust line. Alternatively, the vent line may be vented directly to atmosphere.

Preferably, a bellows is provided for enclosing and sealing the fluid vent line and control lines of the valve-plate and support-ring actuators from the valve chamber. As shown in FIG. 8, a carriage bellows 157 is provided to isolate valve chamber 39 and thus the vacuum chamber from the first fluid control lines. An upper end of the carriage bellows includes a pivot-casing flange 158 secured to fluid port 54 and a carriage-arm flange 159 secured to carriage arm 62.

Preferably, the carriage bellows, as well as the other bellows described above, are expandable stainless steel bellows such as those described in my prior patents including the '899 patent. Preferably, the end of each bellows is welded to its respective mounting flange. The mounting flanges are preferably provided with one or more sealing grooves which are dimensioned to receive o-rings and/or other sealing means in a well-known manner to further enhance air-tight and vacuum-tight sealing.

As used in the present invention, the stainless steel bellows provide an air-tight seal between the vacuum chamber and the moving parts associated with the actuators of the present invention, including carriage actuator 72, valve plate actuator 100, and support ring actuator 115. In particular, the stainless steel bellows isolate valve chamber 39 from the sliding interengagement of drive shaft 81, valve-plate piston rod 101, and support ring piston rods 117. In this manner, particular debris caused by wear and metal-to-metal contact between the sliding surfaces is prevented from getting into the valve chamber where it could then migrate to the vacuum chamber and damage the vacuum chamber and/or equipment fabricated therein.

Preferably, the structural components of the pendulum gate vale of the present invention are formed of aluminum, stainless steel, and/or other suitable materials. As the configuration of the pendulum gate valve minimizes contact between moving parts, materials other than stainless steel may be utilized for the various components thus reducing weight and cost.

The method of using pendulum gate valve in accordance with the present invention can now be described. In one embodiment, pendulum gate valve 30 is installed between adjacent modules of a wafer or substrate handling system such that front opening 40 provides access to a vacuum chamber. During operation of the wafer or substrate handling system in which pendulum gate valve 30 is installed, valve chamber 39 remains at the same pressure as the module adjacent rear opening 44. In other words, in the illustrated embodiment, only front opening 40 is sealed by movement of valve plate 94.

Turning now to FIG. 1 and FIG 2 which illustrate pendulum gate valve 30 in its open state, carriage assembly 62 is located in its open position thereby providing unobstructed access between adjacent modules and, in particular, into the vacuum chamber of the module adjacent front opening 40. In this position, valve plate 93 and support ring 94 are both positioned in their respective unsealed and retracted positions, as shown in FIG. 2. In order to seal the pendulum gate valve, the carriage assembly must be moved to its closed position, as shown in FIG. 4, and the valve plate and the support ring must be moved to their respective extended or sealed positions, as shown in FIG. 5.

First, stepper motor 74 is activated to turn ball screw 78 which, in turn, causes drive shaft 81 to move to the right as viewed in FIG. 3. Movement of the drive shaft, in turn, pivots carriage assembly 62 counterclockwise about pivot pin 59 such that carriage plate swings from left to right, as indicated by arrow A in FIG. 8. Such pivoting action moves carriage plate 64 from its open position to its closed position, the latter being shown in FIG. 4.

Once the carriage assembly is in its closed position between the front and rear openings, the valve-plate actuators may be activated to move valve plate 93 and support ring 94 to their respective sealed and extended positions, as shown in FIG. 5. In particular, the fluid control system is activated to supply fluid, through first supply line 146, simultaneously to the inner ends of circular working chamber 105 and annular working chamber 120. As fluid enters the circular working chamber and presses against the right side of valve-plate piston 101, valve plate 93 moves toward the left to sealingly engage the interior wall surface of front wall 41 about front opening 40. As fluid simultaneously enters the annular working chamber and presses against the left side of support-ring piston 116, support ring 94 moves to the right and engages the interior wall surface of rear wall 45 adjacent rear opening 44 and provides a counter-balanced force to center the carriage plate and urge the valve plate into seated engagement against the front interior wall surface of the housing.

When pendulum gate valve is closed and one wishes to open the valve, the fluid control system is activated to supply fluid through second supply line 147 to the outer ends of working chambers 105 and 120. As fluid enters the circular working chamber and presses against the left side of valve-plate piston 101, valve plate 93 moves toward the right, away from the interior wall surface of front wall 41 and thus unseals the valve plate and returns the valve plate to its retracted position. As fluid simultaneously enters the annular working chamber and presses against the right side of support-ring piston 101, support ring 94 moves to the left and disengages the interior wall surface of rear wall 45 and returns the support ring to its retracted position. In the retracted position, there is ample clearance between the valve plate and the front wall and ample clearance between the support ring and the rear wall. With the valve plate and the support ring in their retracted positions, the stepper motor may be again activated to swing the carriage assembly back to its open position shown in FIG. 1.

Advantageously, the pendulum gate valve of the present invention provides a compact pneumatically controlled valve assembly that includes a minimum of moving parts which substantially reduces the potential contamination within the valve chamber due to particulate buildup.

Advantageously, the retractable valve-plate/support-ring configuration of the present invention provides a pendulum gate valve having a support ring that counteracts the forces of the valve plate. This configuration promotes the centering of the carriage plate within the valve and thus subjects the carriage assembly to lower forces. Accordingly, the strength requirements of the carriage assembly, and the resulting pendulum gate valve, are reduced thus promoting the production of a lighter, smaller and less expensive valve assembly.

The retractable valve-plate/support-ring configuration of the present invention also minimizes metal-to-metal contact within the valve chamber thus reducing particulate generation within the valve.

Advantageously, the size and power requirements of the carriage actuator may also be reduced because the size and weight of the valve carriage assembly is reduced.

Advantageously, the carriage actuator is only utilized to position the carriage assembly and not to actuate the valve plate. Thus, the size and power requirements may be further minimized.

In another embodiment of the present invention, pendulum gave valve 30a is similar to pendulum gate valve 30 described above but includes modified valve-plate and support-ring actuators as shown in FIG. 13 and FIG. 14. Like reference numerals have been used to describe like components of pendulum gate valve 30a and pendulum gate valve 30.

As shown in FIG. 13, carriage assembly 62a includes a circular valve plate 93a and an annular support ring 94a both of which are reciprocally moveably between respective unsealed and retracted positions. In the illustrated embodiment, valve-plate actuator 100a includes a first double-acting fluid cylinder assembly having a valve-plate piston 101a and three valve-plate piston rods 102a secured to circumferentially spaced portions of the valve plate. Similarly, support-ring actuator 115a includes a second double-acting fluid cylinder assembly having a substantially annular support-ring piston 116a and three circumferentially spaced support-ring piston rods 117a. In the embodiment shown in FIG. 13, the support-ring piston does not form a complete circle. As the valve-plate piston rods and the support-ring piston rods are equilaterally spaced about the carrier plate, forces are distributed substantially equally against the interior walls of the housing about front and rear openings 40 and 44.

In operation and use, pendulum gate valve 30a is used in substantially the same manner as pendulum gate vale 30 discussed above.

For convenience in explanation and accurate definition in the appended claims, the terms "up" or "upper", "down" or "lower", "inside" and "outside", "left" and "right" are used to describe features of the present invention with reference to the positions of such features as displayed in the figures.

In many respects the modifications of the various figures resemble those of preceding modifications and the same reference numerals followed by the subscript "a" designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A pendulum gate valve for creating a vacuum tight seal to a vacuum chamber, said pendulum gate valve comprising:
   a housing defining a valve chamber, said valve housing having a vacuum-chamber opening in a front wall and an access opening in a rear wall aligned with said vacuum-chamber opening and defining a through-hole extending from one side of said valve housing to the other side for providing access to the vacuum chamber;
   a carriage assembly pivotally mounted within the valve housing and moveable between an open position remote from said openings and a closed position between said openings;
   a valve plate reciprocally mounted on one side of said carriage assembly and movable between an unsealed position spaced from said vacuum-chamber opening and a sealed position sealing said vacuum-chamber opening;
   a double-acting valve-plate actuator carried on said carriage assembly for moving the valve between said unsealed and sealed positions, wherein said valve-plate actuator is a pneumatic actuator fluidly connected with said fluid control system via a fluid supply line; and
   wherein said carriage assembly includes a carriage arm having one end pivotally supported by at least one pivot pin extending inwardly from at least one of said front and rear walls of said housing, and wherein said carriage arm includes a yoke having two prongs and said housing includes a pair of removable pivot plates, each having a respective one of said pivot pins pivotally supporting one of said prongs of said carriage arm.

2. A pendulum gate valve according to claim 1, wherein said pendulum gate valve further comprises a fluid-line port mounted on said housing and a carriage bellows having one end sealingly secured to said fluid-line port and another end sealingly secured to said carriage assembly between said two prongs, said fluid supply line extending through said carriage bellows and being isolated from said valve chamber.

3. A pendulum gate valve according to claim 1, wherein said valve-plate actuator includes a valve-plate piston reciprocally extending from said carriage assembly.

4. A pendulum gate valve according to claim 3, wherein said pendulum gate valve comprises a plurality of said valve-plate pistons circumferentially spaced about said carriage plate.

5. A pendulum gate valve according to claim 3, wherein said valve-plate piston is enclosed by a piston bellows having one end secured to said carriage assembly and another end secured to said valve plate.

6. A pendulum gate valve according to claim 5, wherein said piston bellows is stainless steel.

7. A pendulum gate valve according to claim 6, wherein said valve-plate actuator is a double-acting cylinder fluidly communicated with said fluid control system.

8. A pendulum gate valve according to claim 6, wherein said pendulum gate valve further comprises:
   a retractable support reciprocally mounted on another side of said carriage assembly and movable between a retracted position spaced from said access opening and an extended position engaging said valve housing adjacent said access opening; and
   a retractable-support actuator carried on the carriage assembly for moving the valve support between said retracted and support positions.

9. A pendulum gate valve for creating a vacuum tight seal to a vacuum chamber, said pendulum gate valve comprising:
   a housing defining a valve chamber, said valve housing having a vacuum-chamber opening in a front wall and an access opening in a rear wall aligned with said vacuum-chamber opening and defining a through-hole extending from one side of said valve housing to the other side for providing access to the vacuum chamber;
   a carriage assembly pivotally mounted within the valve housing and moveable between an open position remote from said openings and a closed position between said openings;
   a valve plate reciprocally mounted on one side of said carriage assembly and movable between an unsealed position spaced from said vacuum-chamber opening and a sealed position sealing said vacuum-chamber opening;
   a valve-plate actuator carried on said carriage assembly for moving the valve plate between said unsealed and sealed positions;
   a retractable support reciprocally mounted on another side of said carriage assembly movable between a retracted position spaced from said access opening and an extended position engaging said valve housing adjacent said access opening; and
   a retractable-support actuator carried on the carriage assembly for moving the valve support between said retracted and support positions, wherein said valve-plate actuator and retractable-support actuators are pneumatic actuators fluidly connected with said fluid control system via a fluid supply line;
   wherein said carriage assembly includes a carriage arm having one end pivotally supported by at least one pivot pin extending inwardly from at least one of said front and rear walls of said housing; and
   said carriage assembly including a pair of pivot pins, wherein said carriage arm includes a yoke having two prongs and said housing includes a pair of removable pivot plates, each having a respective one of said pivot pins pivotally supporting one of said prongs of said carriage arm.

10. A pendulum gate valve according to claim 9, wherein said pendulum gate valve further comprises a fluid-line port mounted on said housing and a carriage bellows having one end sealingly secured to said fluid-line port and another end sealingly secured to said carriage assembly between said two prongs, said fluid supply line extending through said carriage bellows and being isolated from said valve chamber.

11. A pendulum gate valve according to claim 9, wherein said valve-plate actuator includes a valve-plate piston reciprocally extending from said carriage assembly in a first direction and secured to said valve plate, and said retractable-support actuator includes a retractable-support piston reciprocally extending from said carriage assembly in an opposite second direction and secured to said retractable support.

12. A pendulum gate valve according to claim 11, wherein said pendulum gate valve comprises a plurality of said valve-plate pistons and/or a plurality of said retractable-support pistons circumferentially spaced about said carriage plate.

13. A pendulum gate valve according to claim 12, wherein each of said valve-plate and retractable-support pistons is enclosed by a piston bellows, each piston bellows having one end secured to said carriage assembly and another end secured to a respective one of said valve plate and sad retractable support.

14. A pendulum gate valve according to claim 13, wherein said piston bellows are stainless steel.

15. A pendulum gate valve according to claim 11, wherein at least one of said valve-plate and retractable-support actuators is a double-acting pneumatic cylinder fluidly communicated with said fluid control system.

* * * * *